US000001326H

United States Statutory Invention Registration [19]

[11] Reg. Number: H1326

Lefebvre

[43] Published: Jul. 5, 1994

[54] TRANSIENT FLOW LOOP SYSTEM

[75] Inventor: Paul J. Lefebvre, Tiverton, R.I.

[73] Assignee: The United States of America as represented by the Secretary of the Navy, Washington, D.C.

[21] Appl. No.: 632,708

[22] Filed: Dec. 24, 1990

[51] Int. Cl.[5] ..... F16K 31/00

[52] U.S. Cl. ..... 137/486; 73/861.59; 137/565; 251/129.04

[58] Field of Search ..... 137/486, 565; 251/129.04; 73/861.59

[56] References Cited

U.S. PATENT DOCUMENTS

| | | | |
|---|---|---|---|
| 4,112,885 | 9/1978 | Iwata | 251/129.04 X |
| 4,780,063 | 10/1988 | Tuckey | 137/565 X |
| 4,930,665 | 6/1990 | Devine | 251/129.04 X |

*Primary Examiner*—David H. Brown
*Attorney, Agent, or Firm*—Michael J. McGowan; Prithvi C. Lall; Michael F. Oglo

[57] ABSTRACT

A system is described for providing means by which the flow in a fluid such as water in a fluid flow loop can be accurately controlled to undergo user defined transients. Besides, the system allows for velocity variations over a wide range of velocities.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

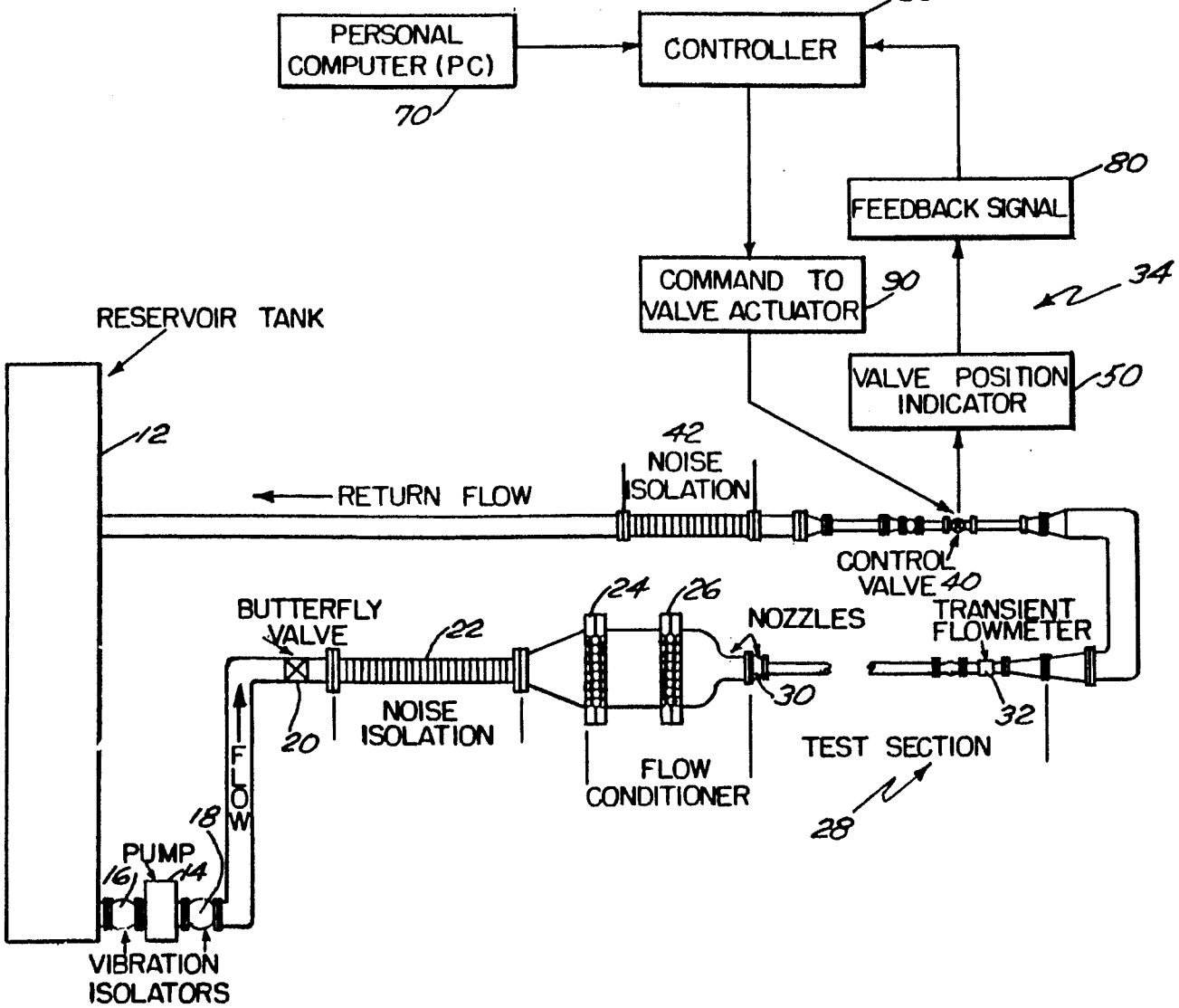
PERSONAL COMPUTER (PC)
70
CONTROLLER
60
FEEDBACK SIGNAL
80
COMMAND TO VALVE ACTUATOR
90
VALVE POSITION INDICATOR
50
34
RESERVOIR TANK
12
RETURN FLOW
42
NOISE ISOLATION
CONTROL VALVE
40
TRANSIENT FLOWMETER
32
NOZZLES
30
TEST SECTION
28
26
24
FLOW CONDITIONER
22
NOISE ISOLATION
BUTTERFLY VALVE
20
FLOW
18
PUMP
14
16
VIBRATION ISOLATORS

TRANSIENT FLOW LOOP SYSTEM

STATEMENT OF GOVERNMENT INTEREST

The invention described herein may be manufactured and used by or for the Government of the United States of America for governmental purposes without the payment of any royalties thereon or therefor.

Subject patent application is related to my other three copending patent applications Ser. No. 07/632,709, now U.S. Pat. No. 5,078,009; Ser. No. 07/632,872; and Ser. No. 07/632,707; of even filing dates and which are also directed to various aspects of measurements of flow of fluids such as water.

BACKGROUND OF THE INVENTION (1) Field of the Invention

This invention generally relates to fluid flow measurements and more specifically to a system for providing means for accurately controlling transients in a fluid flow loop.

(2) Statement of the Prior Art

Most known water tunnels or flow loops operate under steady-state flow conditions, i.e., a constant flowrate or velocity. Several facilities have been developed in the past to provide acceleration to the flow. However, they were extremely limited in the type of accelerations or transients which they could provide to the user of the facility. One type of facility utilized a constant pressure tank which provided constant pressure to the test section. The flow could be started from rest or from some initial velocity. To initiate a transient to the flow, a valve positioned downstream of the test section would be opened as quick as possible. As the valve opened, the flow velocity would initially increase with an increasing rate of acceleration, then reach a maximum acceleration and finally the flow velocity would still increase but at an asymptotically decreasing acceleration until the acceleration became zero and the new final velocity was achieved.

A second type of transient flow control that has been used in the past is to induce sinusoidal motion onto the mean flow by incorporating some mechanical means of perturbing the flow. This can be accomplished by attaching a cylinder perpendicular to the test section itself. A piston installed in this cylinder is made to move with simple harmonic motion (i.e., it moves back and forth within the cylinder) thus taking fluid out from the test section and then pushing it back into the test section in a cyclic fashion. The flow changes from an accelerating condition to a decelerating one over each cycle of the sinusoid.

The disadvantage of both transient control systems is that the use have very little control over the type or shape of the transient time history curve that the flow undergoes. The level and duration of any one value of acceleration throughout the transient is virtually impossible to control or to be specified by the user.

To properly investigate, evaluate and test devices or products which operate under transient flow conditions, a means for controlling the flow in the test facility is thus needed.

SUMMARY OF THE INVENTION

The objects and advantages of the present invention are accomplished by using a transient flow loop system which accurately controls user defined transients in the fluid flow over a wide range of velocities. The system uses a transient fluid flowmeter which is fully described and claimed in my copending patent application of even filing dates. The system includes a pump for delivering the fluid from a reservoir tank to a test section followed by an accurate flowmeter. Downstream of the flowmeter is a control valve section which includes a low noise and cavitation free control valve and valve actuator. The flow loop is completed by returning the fluid to the reservoir tank.

An object of subject invention is to provide a transient fluid flow loop system which controls accurately user defined transients and fluid velocities.

Another object of subject invention is to have a transient fluid flow system which uses an accurate and transient fluid flowmeter.

Still another object of subject invention is to have a transient fluid flow loop system which uses a low noise and cavitation free control valve.

Other objects, advantages and novel features of the invention will become apparent from the following detailed description thereof when considered in conjunction with the accompanying single FIGURE.

BRIEF DESCRIPTION OF THE DRAWINGS

The single FIGURE shows various components of an embodiment of the inventive concept described and claimed in subject patent application.

DESCRIPTION OF A PREFERRED EMBODIMENT

Referring now to the only FIGURE in the drawings therein shown a transient flow loop system 10 according to the teachings of subject invention. It should be noted that most of the components used in the system are conventional components which have been used in the steady-state fluid flow measurements and are commercially available units. Consequently, no detailed description of these components will be supplied here. Any commercially available components or their equivalents are well known to persons of ordinary skill in the art. The component which is unique in the system is the flowmeter which is described in detail and claimed in my copending patent application of even filing date. That application is incorporated herein by reference in its entirety.

It includes a reservoir tank 12 which contains the fluid, preferably seawater, under test. The fluid is supplied from the reservoir 12 by means of a conventional pump 14 which has a pair of vibration isolators 16 and 18.

The fluid then goes through a butterfly valve 20, a noise isolator 22 and flow conditioners such as 24 and 26. The fluid then enters test section 28 through nozzles 30. A transient flowmeter 32 is installed after test section 28.

As mentioned earlier, transient flowmeter and an algorithm therefor are unique and are described in one of my copending patent applications. Downstream of the flowmeter 32 is control valve section 34 which includes a low noise and cavitation free control valve 40 which also includes control valve actuator. The fluid then passes through noise isolation unit 42 before it is returned to the reservoir 12. The control valve section 34 also includes a valve position indicator 50, controller 60, and a general purpose personal computer 70 which processes the flow rate data and controls the function of the controller 60. Valve position indicator 50 also provides an input feedback signal 80 to controller 60. Controller 60 upon receipt of its input from valve position indicator 50 and the personal computer 70 feeds its output to control valve actuator which is a part of control valve 40.

In operation, the fluid flow is controlled in order to undergo user defined transients. This is accomplished by the control system which includes personal computer 70, transient flowmeter 32, control valve 40, valve position indicator 50, and controller 60.

The controller is considered here to be a typical control system controller which provides established feedback control techniques such as proportional or proportional plus integral control. This controller can be either of the analog type where a dedicated analog controller board is used or a digital controller where the feedback control algorithm and hardware resides within computer 70. The controller functions implied here are meant to include receiving the command or desired instantaneous values from computer 70 receive the feedback or actual instantaneous values from the valve position indicator 50 and generate the error signal and the resulting actuating signal to the valve actuator.

To assure accurate and stable control, the pump 14 is a centrifugal pump which delivers essentially constant pressure for all flowrates to be provided through the test section. By operating on the approximately constant pressure portion of the pump performance curve, the flowrate in the test section can be controlled totally by the control system with no effects due to transients in the pump itself.

It has been shown on the prototype system that the steady-state calibration of the control valve 40 is valid during a transient flow situation (i.e., for a given valve opening, the flowrate across the valve during transient operation is essentially the same flowrate as during the steady-state case). Therefore, during transient operation of the facility, only the valve position vs. time need to be controlled to properly provide the user defined flowrate vs. time. Note that specifying flow velocity vs. time is the same as specifying flow acceleration.

The control system then works as follows. The desired flow velocity for various instances in time is placed into a computer data file by the user. The data file is then read into a program by the PC which then converts the flow velocity into valve position at each instant of time. The steady-state valve calibration is used for this conversion. During the transient operation of the facility, this valve position data is the command signal sent to the controller at the appropriate instances in time. The controller simultaneously receives the feedback signal from the valve position indicator 50 in order to generate the error signal for the feedback system. The controller 60 then sends a signal to the valve for adjustment of position as required. The data from the transient flowmeter is simultaneously monitored to assure that the correct flow velocity vs. time is indeed obtained.

Briefly stated, the transient flow loop system makes use of a control system which includes an accurate transient flowmeter, control valve, a controller and a computer so as to obtain user desired transients in the flow rate of the fluid.

From the foregoing description, one skilled in the art can easily ascertain the essential characteristics of this invention and without departing from the spirit and scope thereof, can make various changes and modifications of the invention to adapt it to various usages and conditions. It is therefore understood that within the scope of the appended claims the invention may be practiced otherwise than as specifically described.

What is claimed is:

1. A transient flow loop for generating user defined transients in a fluid flow which comprises:

a storage tank for supplying the fluid;

a pumping means to supply the fluid at a constant pressure;

noise reducing means for obtaining noise-free environment for testing of the flow of the fluid;

a flowmeter means for accurately measuring the flow rates of the fluid;

control valve means for controlling the transients to be introduced in the flow rate of the fluid.

2. The transient flow loop system of claim 1 wherein said control valve means further includes a controller and a computer to control the transient generated in the flowrate of the fluid.

3. The transient flow loop system of claim 2 wherein said pumping means is a centrifugal pump.

4. The transient flow loop system of claim 3 wherein said transient flowmeter is transient electromagnetic flow meter for accurately measuring the transients in the flow rate of the fluid.

* * * * *